United States Patent

[11] 3,572,751

| [72] | Inventors | Larry W. Burr;<br>Harold V. Elliott, Saginaw, Mich. |
|---|---|---|
| [21] | Appl. No. | 833,562 |
| [22] | Filed | June 16, 1969 |
| [45] | Patented | Mar. 30, 1971 |
| [73] | Assignee | General Motors Corporation<br>Detroit, Mich. |

[54] DISLODGEABLE SCREW ANCHORS AND INSTALLATION
17 Claims, 13 Drawing Figs.

[52] U.S. Cl. ..................................................... 280/150,
151/41.75
[51] Int. Cl. ..................................................... B60r 21/00
[50] Field of Search .......................................... 280/150,
150 (B); 180/82; 200/61.54; 85/80; 151/41.75

[56] References Cited
UNITED STATES PATENTS

| 2,707,013 | 4/1955 | Flora et al. ..................... | 85/80 |
| 2,775,664 | 12/1956 | Lincoln et al. ................. | 200/61.54 |
| 2,853,113 | 9/1958 | Flora et al. ..................... | 151/41.75 |
| 2,956,605 | 10/1960 | Rapata ........................... | 85/80 |
| 3,373,965 | 3/1968 | Bien et al. ...................... | (280/87UX) |

*Primary Examiner*—Kenneth H. Betts
*Attorneys*—Paul Fitzpatrick and Jean L. Carpenter ABSTRACT: A neutral start and backup switch is mounted on a collapsible steering column by screws and screw anchors. The anchors have a breakaway feature so that the switch will not unduly hinder collapse of the steering column upon some casualty to the vehicle. This feature is provided by ramp surfaces on the legs of the screw anchor which enter a hole in steering column such that upon enforced relative movement of the switch and column the screw anchors are cammed out of the mounting holes in the column. The anchors may be metal or plastic.

PATENTED MAR 30 1971
3,572,751
SHEET 1 OF 2
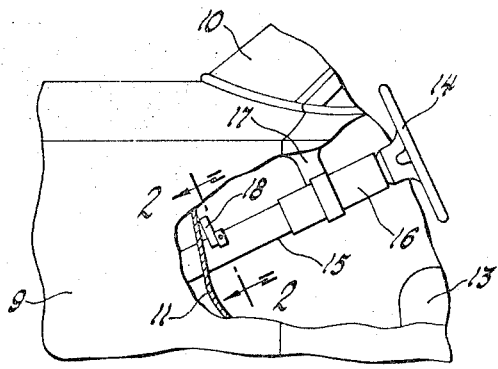
Fig.1
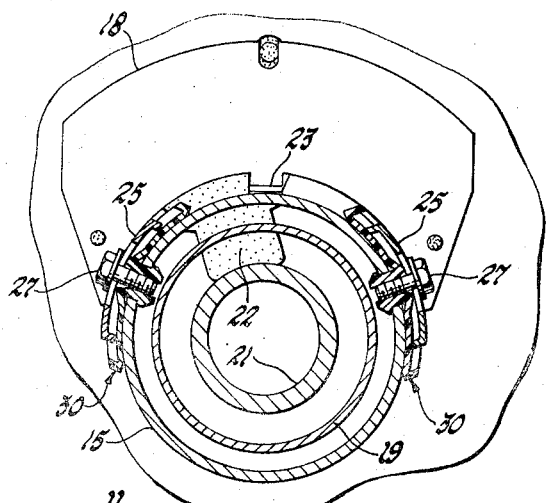
Fig.2
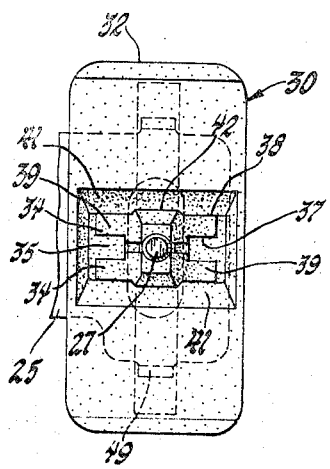
Fig.4
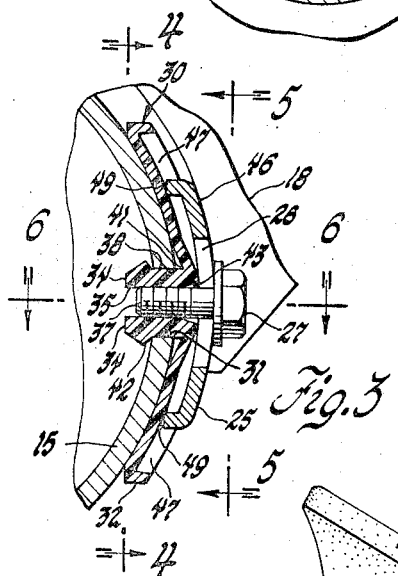
Fig.3
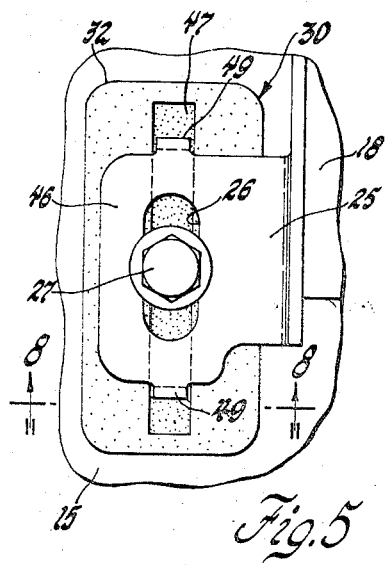
Fig.5
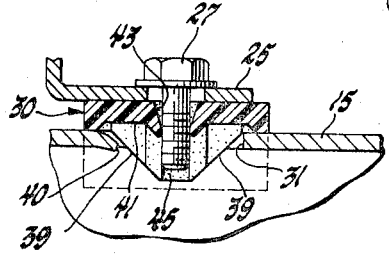
Fig.6
Fig.7
INVENTORS
*Larry W. Burr &*
*Harold V. Elliott*
BY
*Paul Fitzpatrick*
ATTORNEY

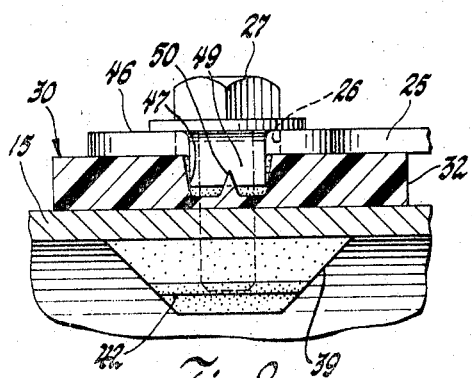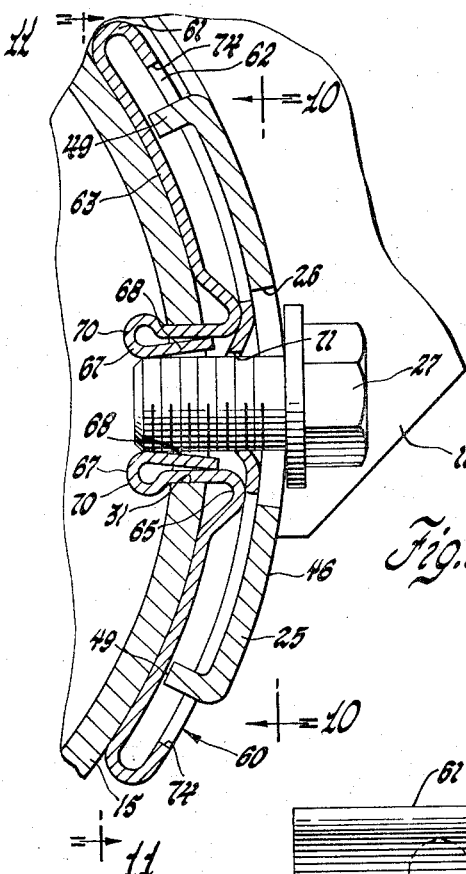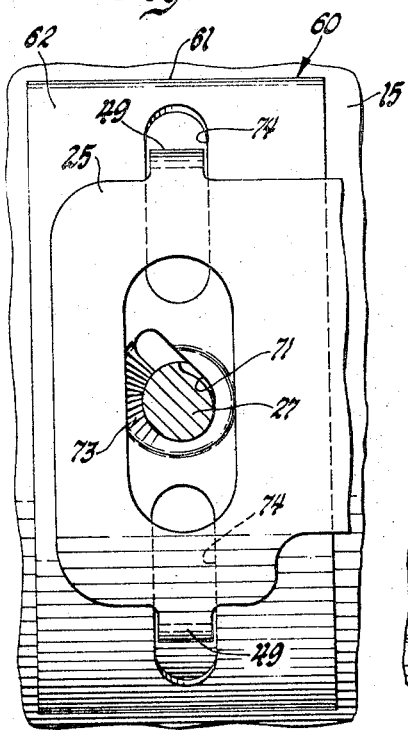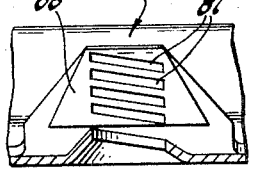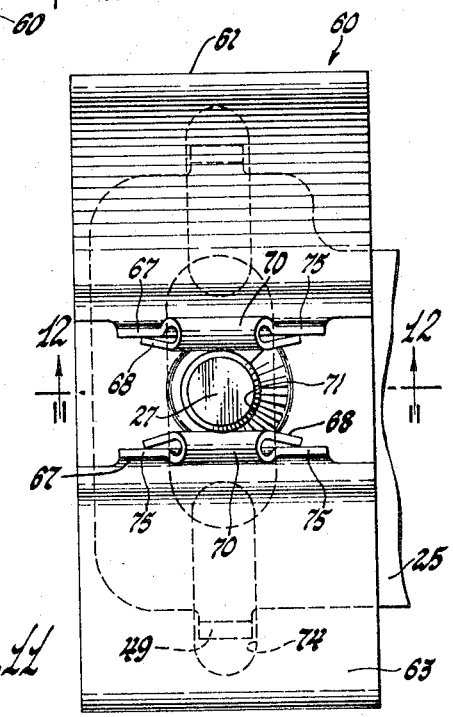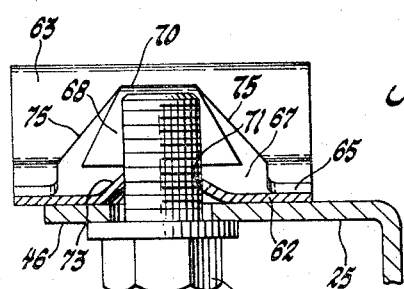

DISLODGEABLE SCREW ANCHORS AND INSTALLATION

Our invention is directed to providing increased safety in steering column arrangements in motor vehicles and also to the provision of a flexible or resilient screw anchor or grommet having breakaway features which cause it to be released from a steering column or plate on which it is mounted upon forcible translation of the mounted body relative to the steering column or plate.

It is common practice to mount a switch called a neutral start and backup switch on the steering column of an automobile. This switch controls a starter interlock to prevent starting the engine when the car is in gear and also energizes backup lights upon shifting into reverse. The switch is actuated by a transmission control tube which extends through the vehicle steering column from the column-mounted transmission control arm.

Currently, vehicles are equipped with collapsible steering columns and steering shafts so that the risk of injury to the driver of the car from a front end collision is reduced. It is desirable to minimize the resistance to collapse of the steering column which might be exerted by the protruding switch housing.

It is also, of course, desirable to facilitate the assembly of the switch to the steering column. Our invention provides an improvement in screw anchors or grommets of types which have previously been employed for the purpose of creating a seat for a screw which mounts one body to another such that, upon relative forced translatory movement of the two bodies, the anchor is readily disengaged from the steering column in which it is mounted. Also, the structure improves the rigidity reliability of the switch mounting and facilitates assembly.

The nature of our invention and the advantages thereof will be clear to those skilled in the art from the succeeding detailed description of preferred embodiments of the invention, which is presented to explain the principles of the invention but not by way of limitation to any particular structure.

While our screw anchor was conceived as a solution to the particular problem in a vehicle steering gear referred to above, it will also be clear that our screw anchors may be employed in any other installation in which the breakaway feature is desirable.

The principal objects of our invention are to provide an improved steering gear assembly, to provide improved means for retention of an external device such, for example, as a switch on a steering column, to reduce the resistance to collapse of a collapsible steering column, to provide improved screw anchors, and to provide a resilient screw anchor which responds to force exerted in a particular direction to cam itself out of the mounting hole. A further object is to provide a resilient screw anchor particularly suited to the requirements of a switch installation on a steering column.

Referring to the Drawings:

FIG. 1 is a fragmentary elevation view of an automobile with parts cut away and in section.

FIG. 2 is a transverse section of a steering column assembly taken on the plane indicated by the line 2-2 in FIG. 1.

FIG. 3 is an enlarged view of a portion of FIG. 2.

FIG. 4 is an internal view with the steering column cut away as indicated by the line 4-4 in FIG. 3.

FIG. 5 is an external view of the installation as indicated by the line 5-5 in FIG. 3.

FIG. 6 is a sectional view taken on the plane indicated by the line 6-6 in FIG. 3.

FIG. 7 is an axonometric view of a plastic screw anchor.

FIG. 8 is a sectional view taken on the plane indicated by the line 8-8 in FIG. 5 illustrating an optional feature of the anchor.

FIG. 9 is a fragmentary view taken on a plane as indicated by line 2-2 in FIG. 1 of an installation employing a metal screw anchor.

FIG. 10 is an outer side view of the metal screw anchor.

FIG. 11 is an inner side view of the same.

FIG. 12 is a sectional view taken on the plane indicated by the line 12-12 in FIG. 11.

FIG. 13 is a partial view of a modified metal screw anchor.

Referring first to FIG. 1, the vehicle there illustrated comprises a front quarter panel 9, a windshield 10, a toeboard and firewall 11, a driver's seat 13, steering wheel 14, a steering column including a lower portion 15 and a slidable telescoping upper portion 16, connected to the dash by a bracket 17, and a neutral start and backup switch 18 mounted on the steering column 15 just near the fire wall. Referring now to FIG. 2, the steering column 15 is a tubular member enclosing a transmission control tube 19 extending from a transmission control arm (not illustrated) adjacent the steering wheel to suitable linkage to control the vehicle transmission. The details of the column are immaterial to our invention, but may be such as are shown in U.S. Pat. No. 3,392,599 to White, Jul. 16, 1968. A hollow steering shaft 21 which transmits movement from the steering wheel to the steering gear of the vehicle is mounted within the control tube.

The neutral start and backup switch 18, the details of which are immaterial to the invention, is fixed to the outside of the column. It includes a plastic actuating finger 22 which extends through an opening in the control tube so that the switch may be actuated by rotation of the tube. The switch assembly includes a foot 23 which rests against the column 15 and two brackets 25 by which it is fixed to the column.

Each bracket 25 has a cylindrical curvature to conform generally to the outer surface of the column 15. It has a slot 26 (FIGS. 3 and 5), elongated circumferentially of the column, to receive a mounting screw 27 preferably of a self-tapping type.

In the structure of FIGS. 2 to 8, each screw 27 is received in an anchor 30 of suitable plastic material such as nylon, these screw anchors being received in turn in a generally rectangular hole 31 in the column 15. Each screw anchor 30 comprises an arcuate or cylindrical head 32 and a shank defined by two legs 34 extending from the concave face of the head. The legs 34 are separated by a cleft 35. Each leg has an inner face 37, an outer face 38, and two end faces 39. The two end faces converge steeply toward each other in a direction away from the head. Preferably, the faces at each end make an angle of approximately 90° with the faces at the other end.

The undersurface of the head is slightly recessed around the shank as indicated at 41. The outer face of each leg bears adjacent its end remote from the head a flange or bulge 42. When the plastic anchor 30 is shoved through the hole 31, the legs are cammed slightly together and then resiliently spring apart so that the flanges 42 engage the inner surface of the column 15 to retain the anchor in place prior to mounting of the switch 18.

The head 32 has a central hole 43 for the screw 27, which may be tapered to facilitate entry of the screw, and which communicates with the cleft 35. The inner faces of the legs may be grooved as indicated at 45 in FIG. 7 to provide additional surface contact with the screw. The dimensions of the parts preferably are such that the entry of the screw into the anchor spreads the legs apart to tighten the anchor on the column and provide resistance to inward flexure of the legs such as would release the flanges 42 from the body of the column.

Each bracket 25 includes an arcuate plate 46 which overlies the outer surface of the head 32. Head 32 is formed with a slot 47 extending across the head on each side of the hole 43 nearly to the end of the head, the slots extending in the circumferential direction of the column. Tongues 49 on the ends of the plate 46 enter into the slots 47 as an aid to locating the bracket when the assembly is made and to make the switch mounting more stable.

To install the switch 18, the anchors 30 are pressed into the holes 31 in the steering column, the switch 18 is put in place with the tongues 49 on the brackets entering the slots 47 of the anchors, and the two screws 27 are inserted and tightened. It will be noted that the two anchorages are approximately 120° to 150° apart around the steering column and, with the screws in place, provide a very secure anchorage of the switch 18. However, if because of a collision the upper section 16 of the steering column telescopes downward over the lower portion 15, it may engage the switch 18 and, in that case, the force exerted in the axial direction of the steering column will cause the anchors 30 to be cammed out of the holes in the column by the ramp action of the end faces 39 on the end of the hole. These faces are at about a 45° angle to the axis of the column, as shown most clearly in FIGS. 6 and 7.

Preferably, the side of holes 31 toward the lower end of the steering column is slightly deformed to provide a ramp 40 (see FIG. 6) which facilitates the dislodgement of the screw anchor.

FIG. 8 illustrates a feature which has been found desirable in applications of the anchor of the type shown in FIGS. 2 to 7. In this modification, the plastic head 32 of the anchor retains the slot 47 but the anchor is molded to provide a ridge 50 extending upward from the middle of the bottom of the groove. When the screws 27 are tightened, the tongues 49 of the brackets 25 bite into and compress the ridge 50, further contributing to the rigidity of the mounting of the switch. This modification does not affect the breakaway feature previously described.

Some problems with anchor 30 due to creep of the plastic material have led to a desire for a metal anchor usable in the same way as the plastic one. FIG. 9 shows a portion of an installation embodying a sheet metal anchor, this FIG. corresponding generally to the showing of FIG. 3 with the plastic anchor. FIGS. 10, 11, and 12 are further views of the sheet metal anchor.

The sheet metal anchor 60 of FIGS. 9 through 12 may be substituted for the plastic anchors 30 with the same configuration of steering column, switch, and mounting brackets 25. The parts illustrated in FIG. 9 which are the same as those of previous FIGS. retain the same reference numerals. The sheet metal anchor 60 is a single sheet of spring steel or the like which is blanked, punched, and formed to the configuration illustrated. More specifically, the anchor includes an arcuate head 61, outer face portion 62 of which is at the center of the strip prior to forming. The strip is rebent at both ends to provide an inner portion 63 which lies against the steering column 15. An outwardly formed fold 65 in the inner portion extends away from the steering column and into contact with the outer face portion 62 adjacent the center of the anchor. Beyond the fold the anchor continues to form a leg 67, the terminal portion 68 of which is rebent and lies against the outer portion as shown clearly in FIGS. 9 and 11. Each leg is formed to define a flange or bulge 70 on its outer surface which engages against the inner surface of the steering column 15. These legs are separated by a cleft which provides room for the mounting screw 27 which is fitted through a roughly keyhole-shaped hole 71 in the center of the space portion 62. The strip around this hole is impressed to define a single screw thread to mate with the thread on the mounting screw as indicated at 73. Slots 74 extending circumferentially of the column in the outer face 62 of the anchor receive the tongues 49 of the switch mounting bracket. The legs 67 have end faces 75 converging at about a 90° angle or, in other words, at about a 45° angle to the axis of the steering column. Thus, as in the form of anchor previously described, upon exertion of sufficient force in the direction axially of the column, the end faces 75 ride up on the end of the hole 31 in the steering column to cam the anchor out of the hole and release the switch 18.

The fragmentary view of FIG. 13 illustrates a metal anchor 80 which may be identical to anchor 60 previously described except for the provision of serrations 81 on the portions 68 of the legs to engage the threads of the screw 27. These serrations greatly increase the strip-torque level of the retaining screws.

As will be apparent, the mounting of the switch of the steering column is the same with the sheet metal anchor as with the plastic anchor, and both have in common the basic mode of anchorage in the hole, the arcuate shape of the head, the recess or hole in the head to receive the tongue on the mounting bracket, and, most importantly, the ramp end faces to cause the switch to break away upon displacement axially of the column.

The advantages of the anchors as described in providing for ready release of the neutral start backup switch upon telescoping action of the column will be apparent.

Obviously, the principles of the invention can be applied to other installations. Anchors such as anchors 30 and 60 may be applied to other cylindrical bodies and arcuate plates and, by suitable configuration of the head to mate with the plate surface, they may be applied to flat or concave plates.

The detailed description of preferred embodiments of the invention for the purpose of explaining the principles thereof is not to be considered as limiting the invention, since many modifications may be made by exercise of skill in the art.

We claim:

1. The combination of a steering column, a body mounted on and projecting from the exterior of the column, and means for retaining the body securely on the column but so as to be automatically detached by excessive force between the body and column in a direction axially of the column, the retaining means comprising at least one resilient fastener anchor fitted in a hole in the column and a fastener extending from the body into the anchor, the anchor having a ramp surface axially of the column and toward the center of the column upon relative movement of the body and column axially of the column.

2. A combination as recited in claim 1 in which the anchor is of a plastic material.

3. A combination as recited in claim 1 in which the anchor is metal.

4. A combination as recited in claim 1 in which the fastener is a threaded fastener.

5. A combination as recited in claim 1 including two anchors disposed at points spaced circumferentially of the column.

6. A combination as recited in claim 5 in which each anchor has a slotted outer face and the body includes tongues extending into the slots in the outer face.

7. A combination as recited in claim 6 in which the body includes two tongues spaced circumferentially of the column entering each fastener.

8. A resilient anchor adapted to lodge in a hole through a plate and to retain a fastener in the anchor, the anchor comprising a head having an undersurface adapted to engage the front of the plate and comprising a shank extending from the undersurface of the head adapted to extend through a hole of elongate outline in the said plate, the shank comprising two legs separated by a cleft, the legs having opposed inner faces defining the cleft, outer faces opposite the inner faces with flanges on the outer faces adapted to engage the rear of the plate at the long sides of the hole to retain the anchor on the plate, and each leg having two end faces, the end faces at at least one end making an acute angle with the head so that a force exerted on the anchor in the direction from one end face to the other generally parallel to the plate will cam the anchor from the plate by the ramp action of the said faces against the plate at the end of the hole in the plate, the anchor including means to receive a fastener to retain a mounted device on the plate.

9. An anchor as recited in claim 8 in which the end faces at both ends make an acute angle with the face.

10. An anchor as recited in claim 8 in which the head is curved to fit a generally cylindrical plate.

11. An anchor as recited in claim 8 having a slot extending across the outer surface of the head.

12. An anchor as recited in claim 11 in combination with a body engaging the outer surface of the head and having tongues entering the slot to stabilize the mounting of the body.

13. An anchor as recited in claim 8 made of plastic material.

14. An anchor as recited in claim 8 made of metal.

15. The combination of a steering column, a body mounted on and projecting from the exterior of the column, and means for retaining the body securely on the column but so as to be automatically detached by excessive force between the body and column in a direction axially of the column, the retaining means comprising at least one resilient screw anchor fitted in a hole in the column and a screw extending from the body into the anchor, the anchor comprising a head having an undersurface adapted to engage the exterior of the column and comprising a shank extending from the undersurface of the head adapted to extend through a hole of elongate outline in the said column, the shank comprising two legs separated by a cleft, the legs having opposed inner faces defining the cleft, outer faces opposite the inner faces with flanges on the outer faces adapted to engage the rear of the column at the long sides of the hole to retain the anchor on the column, and each leg having two end faces, the end faces at at least one end making an acute angle with the head so that a force exerted on the anchor in the direction from one end face to the other generally axially of the column will cam the anchor from the column by the ramp action of the said faces against the column at the end of the hole in the column, the anchor including means to receive the screw.

16. A combination as recited in claim 15 in which two anchors are spaced circumferentially of the column receiving screws to mount the body.

17. A combination as recited in claim 16 in which the heads of the anchors are slotted and the body includes tongues entering the slots in the anchors.